(12) United States Patent
Tonelli et al.

(10) Patent No.: US 7,573,384 B2
(45) Date of Patent: Aug. 11, 2009

(54) METHOD AND SYSTEM FOR DETECTING ATTEMPTS AT MALICIOUS ACTION AGAINST AN INSTALLATION UNDER SURVEILLANCE

(76) Inventors: Giorgio Tonelli, Via Bergiola, 30/A-2, Massa (IT) 54100; Aldo Tonelli, Viale Roma, 140/5, Massa (IT) 54100

( * ) Notice: Subject to any disclaimer, the term of this patent is extended or adjusted under 35 U.S.C. 154(b) by 83 days.

(21) Appl. No.: 11/801,988

(22) Filed: May 10, 2007

(65) Prior Publication Data
US 2008/0034872 A1    Feb. 14, 2008

Related U.S. Application Data

(63) Continuation of application No. PCT/IT2004/000621, filed on Nov. 12, 2004.

(51) Int. Cl.
*G08B 13/00* (2006.01)

(52) U.S. Cl. .................. 340/566; 340/565; 340/541; 367/136

(58) Field of Classification Search ............. 340/660, 340/662, 566, 565, 541; 367/136, 135
See application file for complete search history.

(56) References Cited

U.S. PATENT DOCUMENTS

| 4,107,660 A | * | 8/1978 | Chleboun | 340/566 |
| 6,529,130 B2 | * | 3/2003 | Pakhomov | 340/566 |

FOREIGN PATENT DOCUMENTS

| DE | 19607607 |   | 9/1997 |
| EP | 1005003 | * | 5/2000 |
| EP | 1341137 | * | 9/2003 |
| GB | 1605185 |   | 3/1983 |
| WO | 96/10195 | * | 4/1996 |
| WO | 2004/036342 |   | 4/2004 |

\* cited by examiner

*Primary Examiner*—Daniel Wu
*Assistant Examiner*—Hongmin Fan
(74) *Attorney, Agent, or Firm*—Seed IP Law Group

(57) ABSTRACT

Described are embodiments that detect attempts at malicious action against an installation under surveillance based on signals detected by a plurality of sensors distributed near an installation.

20 Claims, 6 Drawing Sheets

METHOD AND SYSTEM FOR DETECTING ATTEMPTS AT MALICIOUS ACTION AGAINST AN INSTALLATION UNDER SURVEILLANCE

BACKGROUND

1. Technical Field

The present invention relates to the technical field of safety systems and more particularly to a method and a system to be used in detecting attempts at malicious action against an installation under surveillance.

2. Description of the Related Art

As is well-known, it is becoming increasingly necessary to detect and signal in good time, for precautionary purposes, attempts at malicious action against installations of various types, such as enclosed areas, oil pipelines, gas pipelines or pipelines for fluid in general, connections for telecommunication networks or the distribution of electrical energy, airports, power stations, naval ports and other possible sensitive targets of various kinds. For example, in the specific case of oil pipelines, it has recently been observed, with ever increasing frequency, that said installations are subject to malicious action such as sabotage, tampering with the intent of stealing the product transported inside the pipeline, without excluding also possible terrorist attacks.

Said malicious actions can create serious damage both to the environment and to people, as well as causing considerable economic loss.

Some countries, given the frequency of said actions, sometimes resort to human patrolling of the pipelines along sections which can extend for hundreds of kilometers. However, this type of surveillance is very expensive and often not very effective.

Normally, said pipelines are further monitored by centralized systems which measure flow regularity and internal pressure. However, the disadvantage of these monitoring systems is that they signal any malicious action too late, often only after said action has been taken or completed.

Electronic systems using sensors or various kinds of transducers have been known and used for some time for the surveillance of installations. For example, surveillance systems using optical sensors, acoustic and seismic sensors, geophones, radio-frequency signal sensors, etc. are well-known.

Commonly, these systems are provided with processing units which receive signals provided by sensors and then process said signals in order to identify attempts at malicious action, such as entering into protected areas, trespassing, excavations and similar.

It has been observed that the reliability of the safety systems in the known art can be significantly conditioned by external disturbances, for example due to adverse environmental conditions or due to the passage of vehicles, animals or people near the areas to be protected. In fact, these disturbance factors can provoke inappropriate activation of said systems, generating alarm or improper signals.

BRIEF SUMMARY

The object of the present invention is to provide a method and a system for detecting attempts at malicious action against an installation to be put under surveillance which do not have the above-described disadvantages with reference to the prior art.

BRIEF DESCRIPTION OF THE SEVERAL VIEWS OF THE DRAWINGS

Further features and advantages of the present invention will become more apparent from the following detailed description of an exemplary but non-limiting embodiment thereof, as illustrated in the accompanying drawings, in which.

In the figures, equal or similar elements are indicated with the same reference numbers.

DETAILED DESCRIPTION

Figure 1:
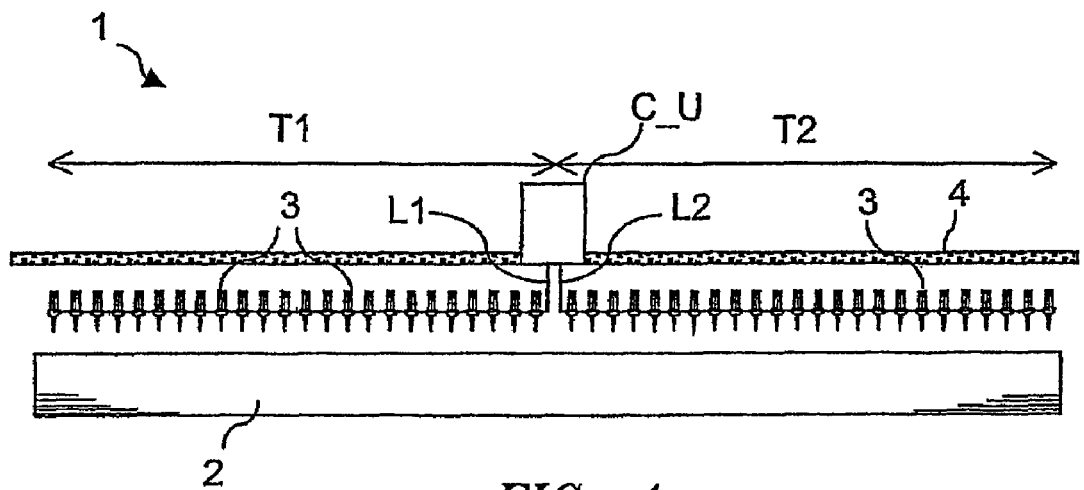
FIG. 1 shows a schematic view of an embodiment of a detection system according to the invention.

With reference to FIG. 1, a preferred embodiment of a detection system 1 according to the invention is described. In particular, the detection system 1 is intended for surveillance of an installation to be protected. In the embodiment in FIG. 1, the installation to be protected corresponds, but is not limited, to a section of an underground pipe 2 of an oil pipeline. For example, the pipe 2 is laid underground at a depth of 1.5 meters below ground level 4.

The detection system I includes one or more sections comprising a respective plurality of sensors 3. The number of said sections varies according to the dimensions and geometry of the installation 2 to be protected. In FIG. 1, for simplicity, only two sections of sensors 3 are represented, indicated with T1 and T2 respectively.

The sensors 3 are such as to provide signals in reply to any external action and the detection system includes a control unit C_U suitable to receive said signals.

In the embodiment in FIG. 1, the signals provided by the sensors 3 are electrical signals and each section T1, T2 comprises a plurality of sensors 3 connected, for example, by means of electrical connection cables L1, L2 to the control unit C_U. However, connections means other than electrical lines can be provided for transmission of the signals provided by the sensors 3 to the control unit C_U.

In a particularly preferred embodiment, each section of sensors T1, T2 is connected to a respective processing unit P1, P2 (shown in FIG. 2) contained inside the control unit C_U. Preferably, said processing units P1, P2 are electronic boards. In an embodiment variation, not shown in the figures, a single processing unit, for example an electronic board, is able to process signals coming from two or more sections T1, T2.

Figure 2:
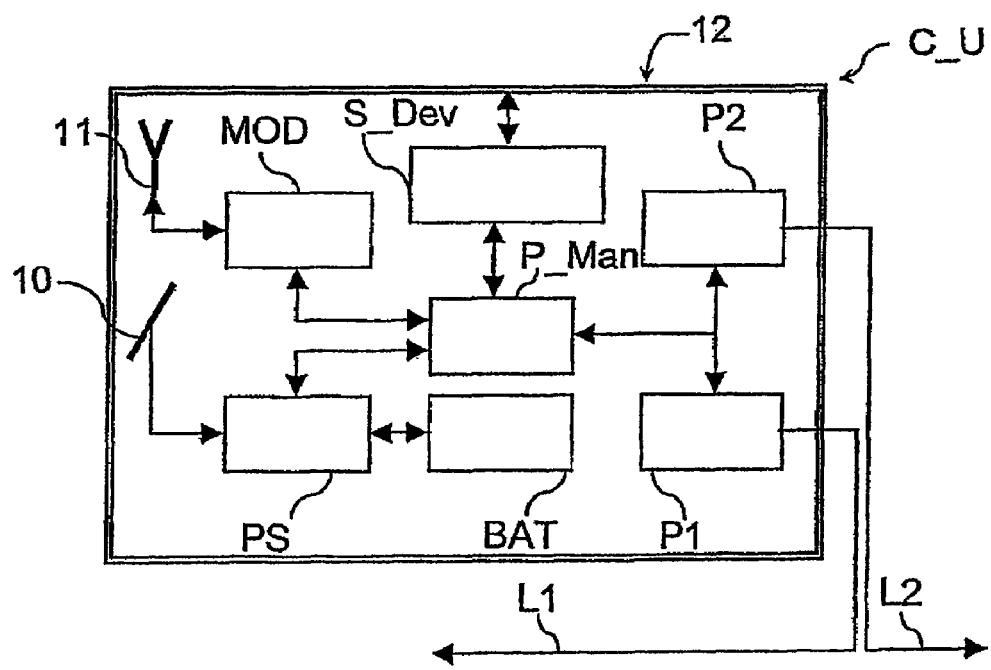
FIG. 2 shows a block diagram of an exemplary embodiment of a control unit usable in the detection system in FIG. 1.

The control unit C_U, whose simplified block diagram is shown in FIG. 2, is preferably protected by a suitable housing 12 provided with an anti-tampering device S_Dev. Preferably, the housing 12 of the control unit C_U is produced in reinforced concrete and is such as to guarantee adequate protection of the electronic apparatus inside from severe weather conditions and sufficient mechanical resistance against any attempts at sabotage.

As mentioned above, the control unit C_U preferably includes, but not necessarily is limited to, two processing units or boards P1, P2, each associated to a respective section T1, T2.

Each control unit C_U also comprises apparatus to feed and manage the processing units P1 and P2. In the preferred embodiment shown in FIG. 2, the control unit C_U comprises: a unit P_Man to manage and feed the processing boards P1, P2, a battery BAT, a feeding unit PS intended also to charge the battery BAT and a photovoltaic panel 12 connected to the feeding unit PS. Preferably, the photovoltaic panel 12 is placed inside the housing 12 and faces the outside thanks to the presence of a sheet of laminated safety glass.

The control unit C_U preferably further comprises transmission/reception means for the exchange of data with a remote unit, for example situated in a control center some distance away. Said data contain, for example, information about the state of the control unit C_U and the sections T1, T2 of sensors 3 connected to it, or information provided by the processing units P1, P2. For example, the transmission/reception means include a GPRS modem, indicated with MOD, connected to a radio antenna 11. Alternatively, for example in areas without GSM cover, the modem MOD is a satellite modem.

Preferably, the sensors 3 are installed, i.e., spread out at intervals, near the installation 2 to be protected, for example with a substantially uniform distribution.

In the particularly preferred embodiment in FIG. 1, where the installation to be protected is a section of pipeline 2, the sensors 3 are seismic sensors placed underground above the pipeline section 2, for example placed underground at a depth of approximately one meter. Seismic sensors are devices known to the skilled in the art and for this reason will be described no further. In a preferred embodiment, without however introducing any limitations, the seismic sensors utilized include a piezoelectric transducer and are produced substantially in accordance with the teachings described in the international patent application published with the number WO 9610195.

In an alternative embodiment, where the installation under surveillance is protected by an enclosure, the sensors utilized are for example bending sensors installed on the enclosure support elements. For example, the sensors are bending sensors including a piezoelectric transducer and are produced substantially in accordance with the European patent application published with the number EP 1341137 A1. A further example of usable sensors is described in the European patent published as EP 1005003 B1.

Hereinafter, for reasons of clarity and without introducing however any limitations, reference will only be made to the case in which the sensors 3 are seismic sensors placed underground and to the case in which the installation to be protected is a section of an underground pipeline 2.

The seismic sensors 3 of a section T1, T2 are such as to supply, in reply to pressure waves propagating in the ground, corresponding electrical signals and are also such as to transmit said electrical signals to the respective processing boards P1, P2 connected to the sections T1, T2 to which they are associated.

The pressure waves which interfere with the seismic sensors 3 may originate not only from events corresponding to attempts at malicious action against the pipe 2 but also from other events generically indicated as environmental disturbance or external disturbance.

For example, excavations carried out to render the pipe 2 accessible to tampering, generate events which lead to impulsive type pressure waves which propagate in the ground. Said pulses correspond, for example, to the repeated action of digging in the ground. The event which generates the pressure waves will therefore, in this case, be the digging action which presumably represents an attempt at malicious action.

For example, a tree falling near the pipe is such as to generate a high-intensity pressure wave in the ground. In this case, the event which generates the pressure wave is the impact of the tree against the ground and such event is defined as an external disturbance, or environmental disturbance, since it presumably does not derive from an attempt at malicious action.

In a particularly preferred embodiment, the sensors of a single section are divided into two or more groups of separate sensors and are distributed near the installation to be protected substantially along its linear extension (or along sections with a linear extension) according to a pattern which periodically repeats itself and such that sensors spatially adjacent to each other belong to separate groups of sensors.

Preferably, the sensors of a section which belong to the same group of sensors are able to transmit the signals detected to the processing unit by means of a common communication line or channel. For example, in a particularly advantageous embodiment, the electrical connection cables L1, L2, include one or more electrical lines, preferably two or four, and the sensors 3 of a same section T1, T2 are divided into several separate groups (preferably, two or four), each group of sensors 3 being connected to a respective electrical line (which in this case represents the common communication line or channel).

For example, in the case where a section T1. includes two hundred seismic sensors 3 and in the case where the connection cable L1 includes four electrical lines, the section T1 can be divided into four groups of seismic sensors 3, each including fifty sensors. Therefore, fifty sensors will be connected to each of the electrical lines included in the connection cable L1. Preferably, the sensors 3 are distributed near the installation under surveillance in such a way that sensors of a same section T1 belonging to separate electrical lines, i.e., sensors belonging to different groups, alternate sequentially with each other.

Figure 3:
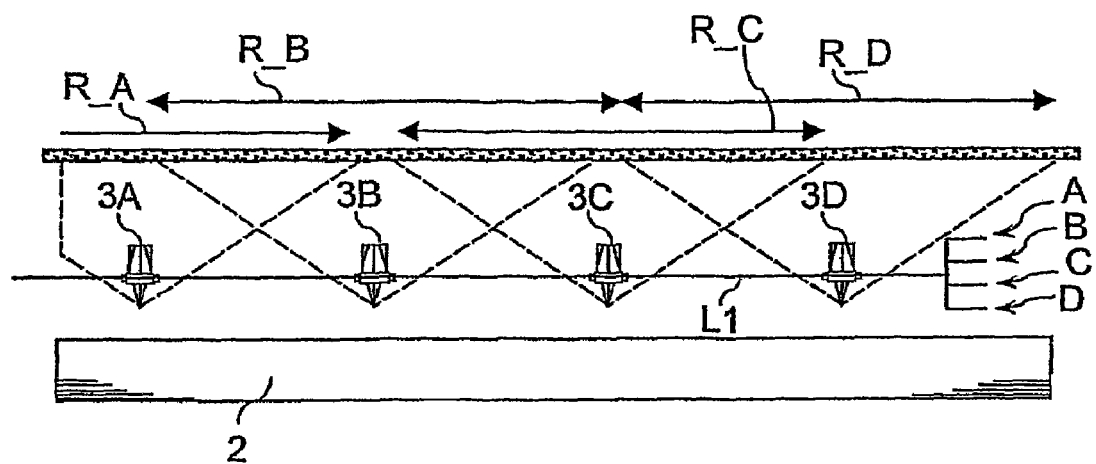
FIG. 3 shows a detail of the detection system in FIG. 1.

In the embodiment schematically illustrated in FIG. 3, the connection cable L1 of the section T1 comprises four electrical lines, indicated respectively A, B, C, D. Therefore, the sensors of the section T1 will be divided into four groups of sensors. 3A, 3B, 3C, 3D indicate sensors connected respectively to the lines A, B, C, D, i.e., belonging to four separate groups.

FIG. 3 also illustrates the section T1 which includes sensors distributed alternately along the pipe 2, according to an arrangement of the type A, B, C, D which, preferably, is repeated periodically along the section T1. Moreover, in the preferred embodiment, the sensors are spaced out from each other in such a way that they partially overlap in the detection areas between spatially consecutive or adjacent pairs of sensors which, as said above, in the preferred embodiment belong to separate groups.

In the embodiment illustrated in FIG. 3, it can be observed that the detection area R_A of the sensor 3A (connected to the electrical line A) partially overlaps the detection area R_B of the adjacent sensor 3B (connected to the electrical line B). The same is true for the areas R_B, R_C and R_C, R_D.

Figure 4:
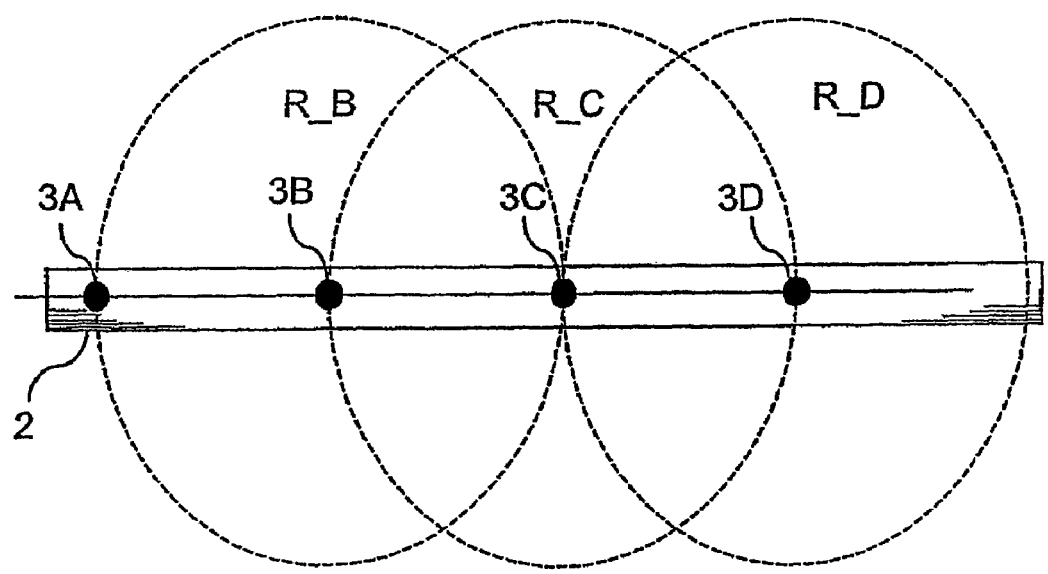
FIG. 4 schematically shows from above some areas of the covering of the sensors of the detection system in FIG. 1.

In FIG. 4, the overlapping of the areas R_B, R_C and R_C, R_D is viewed from above.

Preferably, as can be seen by observing FIGS. 3 and 4 together, in the case where the sensors are underground seismic sensors, the detection areas of the sensors 3 are approximately cone-shaped areas. For example, if the sensors are placed at a depth of about one meter, each of the sensors is operative over a conical detection area which, on the surface, permits the sensor to have a substantially circular coverage with a diameter of approximately 4 meters. In this example, it is preferable for the two consecutive sensors to be placed at a distance of about two meters so that, approximately, a substantial portion of the coverage of the section T1 of sensors comprises points belonging to at least two detection areas associated to separate sensors. Advantageously, this particular choice makes it possible to obtain high functional redundancy as well as enabling collection of a greater quantity of data to be processed, so permitting continual comparison of the signals received from the different lines A, B, C, D of the same section.

Figure 5:
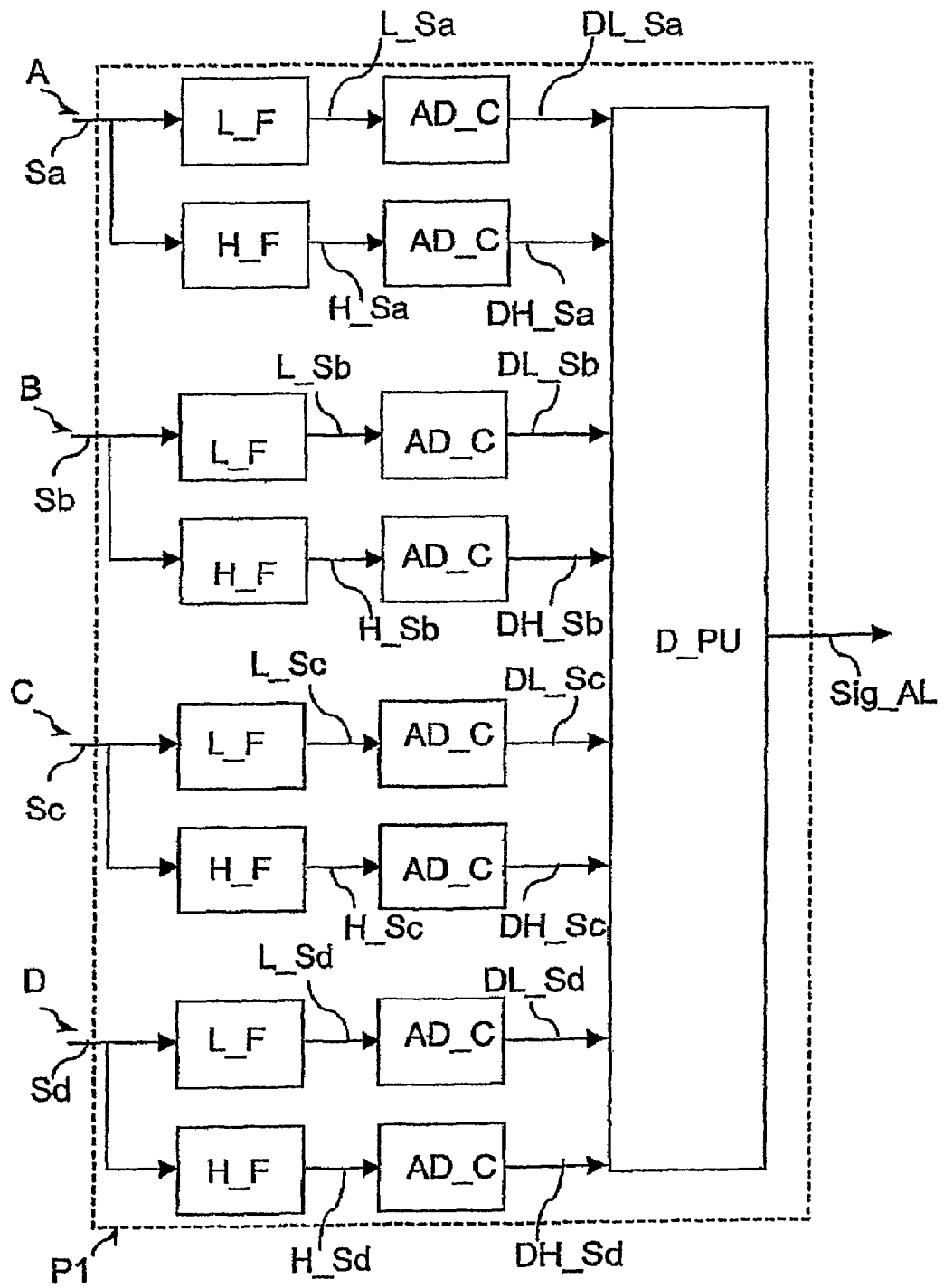
FIG. 5 shows a simplified block diagram of a processing unit usable in the system in FIG. 1.

FIG. 5 shows a simplified block diagram of an embodiment of a processing unit or board P1, suitable for processing detection signals supplied by the sensors 3 of a section T1.

In a particularly preferred embodiment, the processing unit P1 is able to receive at input electrical signals Sa, Sb, Sc, Sd transmitted by the respective electrical lines A, B, C, D included in the section T1, comprising a number of signal inputs corresponding to the number of lines A, B, C, D. In fact, it can be observed in FIG. 5 how the processing unit P1 includes four separate inputs, corresponding to the four lines A, B, C, D. Obviously, in the case where a section T1 includes only two electrical lines A, B, only two electrical signal inputs will be sufficient in the processing unit P1.

Preferably, the processing unit P1 includes filtering means L_F, H_F for providing, from the electrical signals Sa-Sd provided by the sensors of the section T1, corresponding filtered electrical signals L_Sa-L_Sd and H_Sa-H_Sd. More preferably, the filtering means L_F, H_F include active analog filters, i.e., analog filters which can amplify the electrical signals received in input.

In a particularly preferred embodiment, for each line A, B, C, D of the section T1, the filtering means comprise two parallel filters and in particular comprise a first filter L_F with a pass band substantially superimposed on the portion of spectrum typically occupied by signals supplied by the sensors in reply to attempts at malicious action and comprise a second filter H_F with a pass band substantially superimposed on the portion of spectrum typically occupied by signals supplied by the sensors in reply to external disturbance. More preferably, the pass band of the first filter is substantially, or approximately, coincident with the portion of spectrum typically occupied by signals supplied by the sensors in reply to attempts at malicious action. More preferably, also the pass band of the second filter is substantially, or approximately, coincident with the portion of spectrum typically occupied by signals supplied by sensors in reply to external disturbance.

Figure 5A:
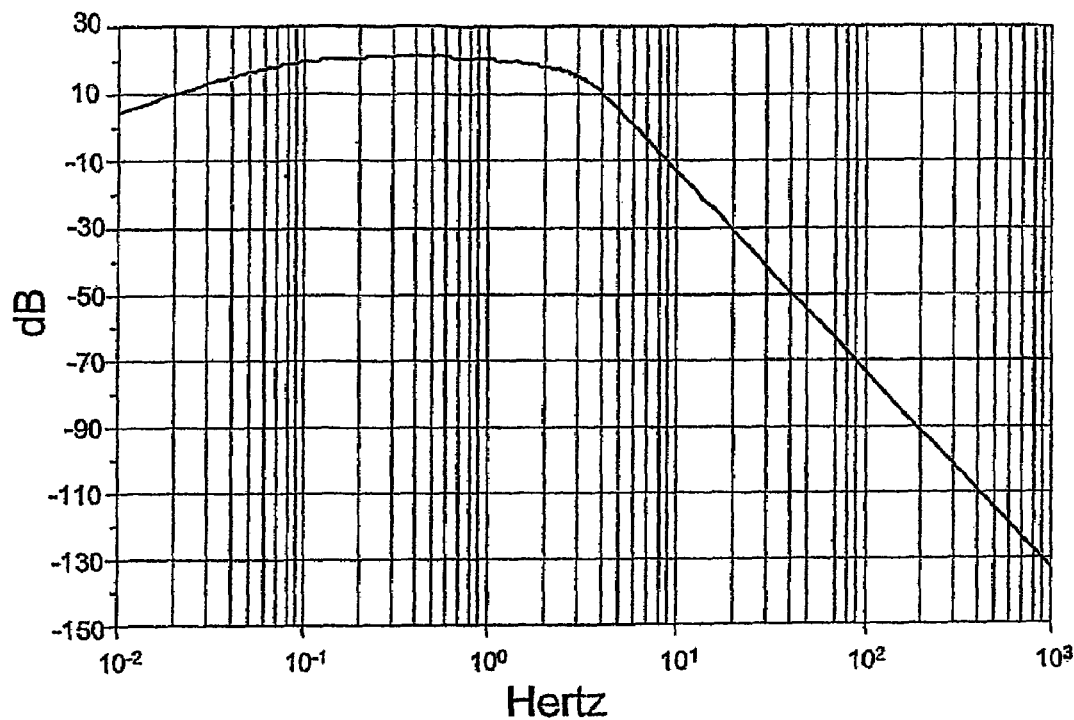
FIGS. 5a and 5b show particular examples of transfer functions of filters usable in the processing unit in FIG. 5.
Figure 5B:
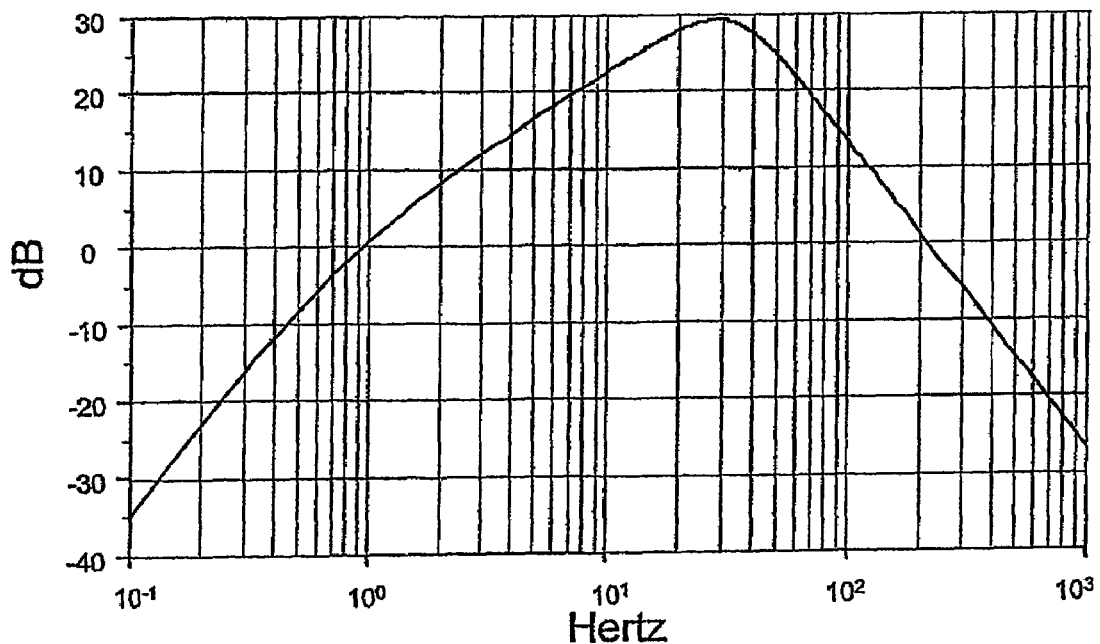

In a particularly preferred embodiment, the first filter L_F is a pass band filter L characterized in that it has its own central frequency (preferably, equal approximately to 1 Hertz) and the second filter H_F is a pass band filter characterized in that it has a central frequency (preferably between 20 Hertz and 35 Hertz) greater than the central frequency of the first pass band filter L_F. For the purposes of this description, central frequency means the frequency at which the filter transfer function reaches its maximum value. FIG. 5a shows a measurement taken of the transfer function of a particularly preferred embodiment of the first filter L_F. In particular, FIG. 5a traces the frequency spectrum (in logarithmic scale) of the amplitude of said transfer function. Said transfer function is characterized by a pass band having a central frequency approximately equal to 0.6 Hertz, a lower cut-off frequency approximately equal to 0.07 Hertz and an upper cut-off frequency approximately equal to 3 Hertz. FIG. 5b shows a measurement taken of the transfer function of a particularly preferred embodiment of the second filter H_F. In particular, FIG. 5b traces the frequency spectrum (in logarithmic scale) of the amplitude of said transfer function. Said transfer function is characterized in that it has a pass band with a central frequency approximately equal to 30 Hertz, a lower cut-off frequency approximately equal to 20 Hertz and an upper cut-off frequency approximately equal to 45 Hertz.

Said filters L_F, H_F considered together provide, from the same electrical signal in input (for example from the signal Sa), two separate filtered versions L_Sa and H_Sa of the same electrical signal Sa. Hereinafter, the two above-mentioned filters L_F, H_F will be called lower pass band L_F and upper pass band H_F respectively, while the signals in output from said filters will be called useful signal L_Sa and disturbance signal H_Sa respectively. It should be observed that these names must not be intended as absolutely indicative of the true nature of the information effectively transported by said signals. In fact, both the useful signal L_Sa and the disturbance signal H_Sa may intrinsically include spectral components due to both possible external disturbance and possible attempts at malicious action.

Preferably, the processing unit P1 further comprises digital processing means D_PU, for example a microprocessor or a microcontroller, and analog/digital conversion means AD_C for providing digitalized electrical signals to the digital processing means D_PU.

More preferably, the analog/digital conversion means include analog to digital converters AD_C, for example 4 bit converters, suitable to receive in input the filtered signals L_Sa-L_Sd and H_Sa-H_Sd and to supply as output, and in particular to the processing means D_PU, filtered and digitalized signals DL_Sa-DL_Sd and DH_Sa-DH_Sd.

The digital processing means D_PU are able to analyze/process the signals received in input so as to provide in output, if necessary, a signal Sig_AL carrying information concerning an alarm.

Figure 6:
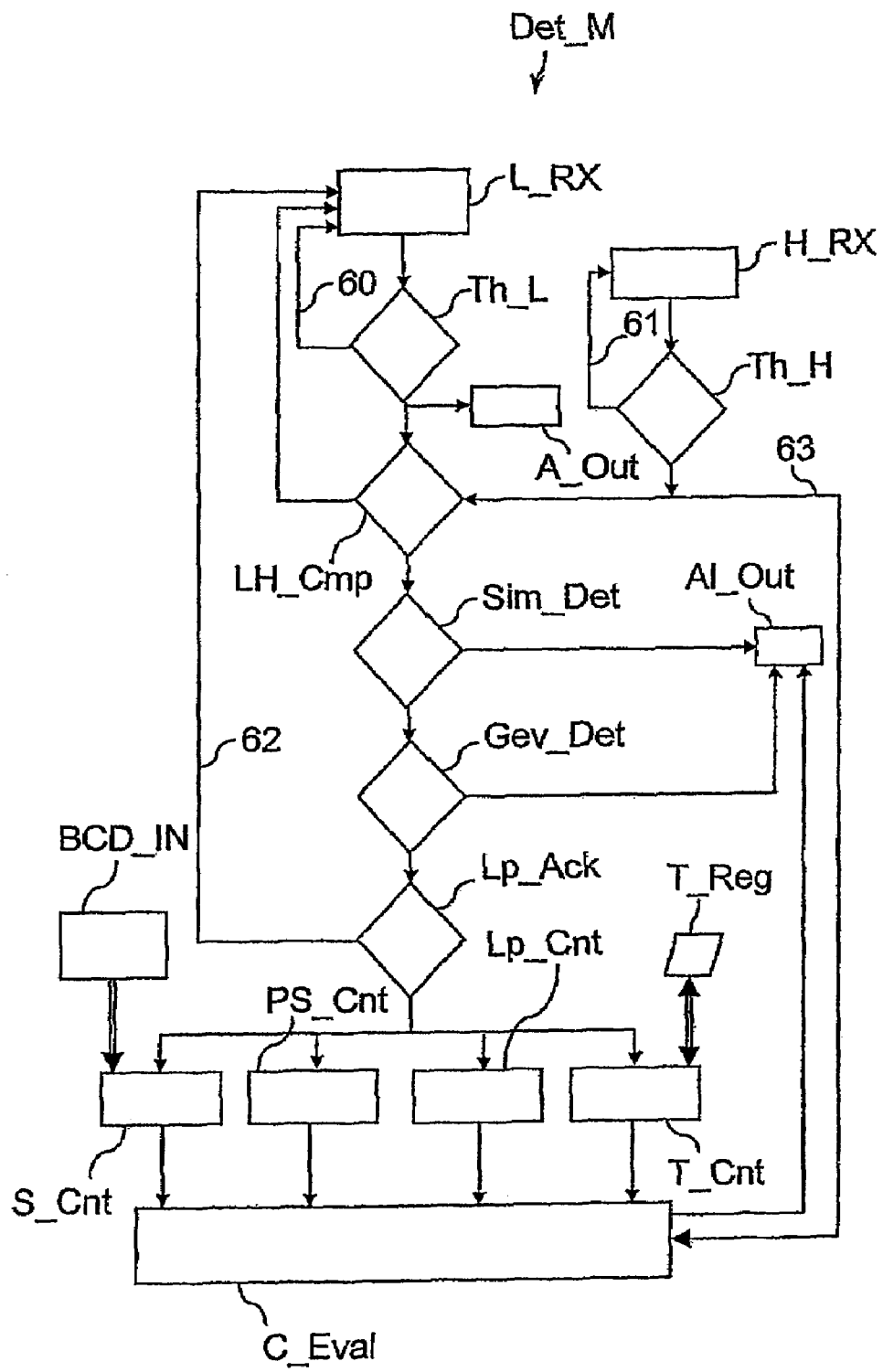
FIG. 6 schematically shows, by means of a flow diagram, the sequence of the steps of a particular embodiment of the detection method according to the invention.

In a particularly advantageous embodiment, the digital processing means D_PU analyze and process the electrical signals supplied by the sensors coming from a section T1 according to a detection method DET_M whose flow chart is schematically illustrated in FIG. 6.

In particular, the flow diagram shown in FIG. 6 schematically illustrates the successive processing steps performed by the digital processing means D_PU on the signal transported on (or received by) only one of the lines A, B, C, D of the section T1, such as, for example, the signal Sa transported on the electrical line A. Hereinafter, all of the processing steps of the detection method DET_M, dedicated to a single line, will also be called line (or channel) processing module.

Each of the signals Sb, Sc, Sd respectively transported on the remaining lines or channels B, C, D will be subjected to a similar line processing module or one identical to that described hereunder with reference to FIG. 6.

In a particularly preferred embodiment, the line processing modules which operate on signals transported on separate lines A, B, C, D of the same section T1 are performed in parallel by the digital processing means D_PU. This should not be interpreted in the limiting sense that corresponding steps of the various processing modules are performed synchronously with each other, since the processing modules of the various lines possess some autonomy.

In accordance with the diagram illustrated in FIG. 6, the detection method DET_M performed by the processing means D_PU operating on the signals coming from line A, or more simply line A processing module, includes a reception step of the electrical signal Sa coming from line A. For the sake of simplicity hereinafter, only the generic expression detection method DET_M will be used whenever possible even if only the line A processing module in particular is being described.

In a particularly advantageous embodiment, the reception step of the electrical signal Sa coming from line A, includes both a reception step L_RX of the useful signal Sa provided at the output of the lower pass band filter L_F and later digitalized and a reception step H_RX of the signal provided at the output of the upper pass band filter H_F and later digitalized. For the sake of simplicity, hereinafter the digitalized useful and disturbance signals will generically be indicated only as useful signal and disturbance signal.

In a particularly advantageous embodiment, the reception step of the signal Sa is followed by a step of comparing the amplitude of said received signal to a minimum threshold level in order to select and isolate the portions of the received signal which have a greater amplitude than the minimum threshold level. Said selected portions will then preferably be stored and subjected to subsequent processing steps, while the unselected signal portions received will be discarded. Preferably, the detection method will function in mode known as "real time", or in a ode of almost "real time". This means, for example, that a portion of the useful signal selected and stored will be subjected immediately (or almost) to the subsequent processing steps while, in the meantime, the detection method can select other portions of the useful signal.

It should be observed that, typically, pressure waves propagating in the ground, interfere with the seismic sensors in such a way that, in the absence of said waves, they output electrical signals having substantially null or constant amplitude or intensity. If, on the other hand, the sensors are hit by said waves, they generate signals which diverge from said null or constant amplitude or intensity (i.e., substantially equal to background noise) and then return to said value after a period of time lasting as long as the duration of said waves.

Preferably, the minimum threshold level is set at a value slightly higher then the average amplitude of the background noise. Said background noise is due both to the external environment and to the noise of the electronic components of the detection system. Preferably, the minimum threshold limit can be modified in self-adapting mode.

Given the above-described nature of the signal supplied by a sensor in reply to pressure waves propagating in the ground, during the step in which said signals are compared to a minimum threshold value it is possible to select or isolate (i.e., single out) those portions of signal which are included between two successive crossings of said threshold by the signal. Said portions substantially and typically correspond to pulses.

In a particularly advantageous embodiment, the step of comparing the amplitude or intensity of the received electrical signal Sa to the minimum threshold level, includes both a step of comparing Th_L the useful signal DL_Sa to a first threshold level and a step of comparing Th-H the disturbance signal DH_Sa to a second threshold level. Said first and second threshold levels can also be set so as to be coincident.

The arrows 60 and 61 in the diagram in FIG. 6 indicate that if, during the comparing steps Th_L and Th_H, no portions of useful or disturbance signals having higher amplitude than the respective minimum threshold levels are isolated, the successive processing steps will not be performed and the system continues listening to the signal supplied by the sensors, implementing the reception steps L_Rx and H_Rx.

Preferably, the portions of the useful signal DL_Sa with an amplitude greater than the minimum threshold level, i.e., the above-threshold portions of the useful signal DL_Sa, are stored.

Preferably, the detection method includes a successive step indicated with A_Out which sends the above-threshold portions of the useful signal to the processing modules of the signals transported on the other lines B, C, D which, as said above, are preferably performed in parallel and in the same way as the detection method Det_M, or module, represented in FIG. 6 intended in particular for the analysis of the signal coming from a single line A.

As illustrated in FIG. 6, the detection method Det_M includes a successive cross-check comparison step LH_CMP, for comparing portions of useful signal identified during the comparing Th_L step as above-threshold, to corresponding portions of disturbance signal Th_H identified as above-threshold. The term corresponding refers to portions of the useful signal and the disturbance signal respectively substantially temporarily overlapping or substantially centered on each other.

In a particularly preferred embodiment, the cross-check control step LH_CMP is performed in accordance with the following criteria:

a portion of above-threshold useful signal characterized in that it does not have a corresponding portion of above-threshold disturbance signal, is selected and possibly stored or kept in memory for subsequent processing;

a portion of above-threshold disturbance signal characterized in that it does not have a corresponding portion of above-threshold useful signal, is discarded, i.e., ignored;

a portion of above-threshold useful signal, characterized in that it has an amplitude (for example, peak, effective, or average) greater or equal to the amplitude of a corresponding portion of above-threshold disturbance signal, is selected and possibly stored or kept in memory for subsequent processing;

a portion of above-threshold useful signal, characterized in that it has an amplitude (for example, peak, effective, or average) lower than the amplitude of a corresponding portion of above-threshold disturbance signal, is discarded, i.e., not subjected to subsequent processing, being classified, for example, as originating from an external disturbance. It should be considered that, as an alternative to a comparison based on observation of signal amplitude, any other measurement of the intensity of said signals can be used for comparison purposes.

Figure 7A:
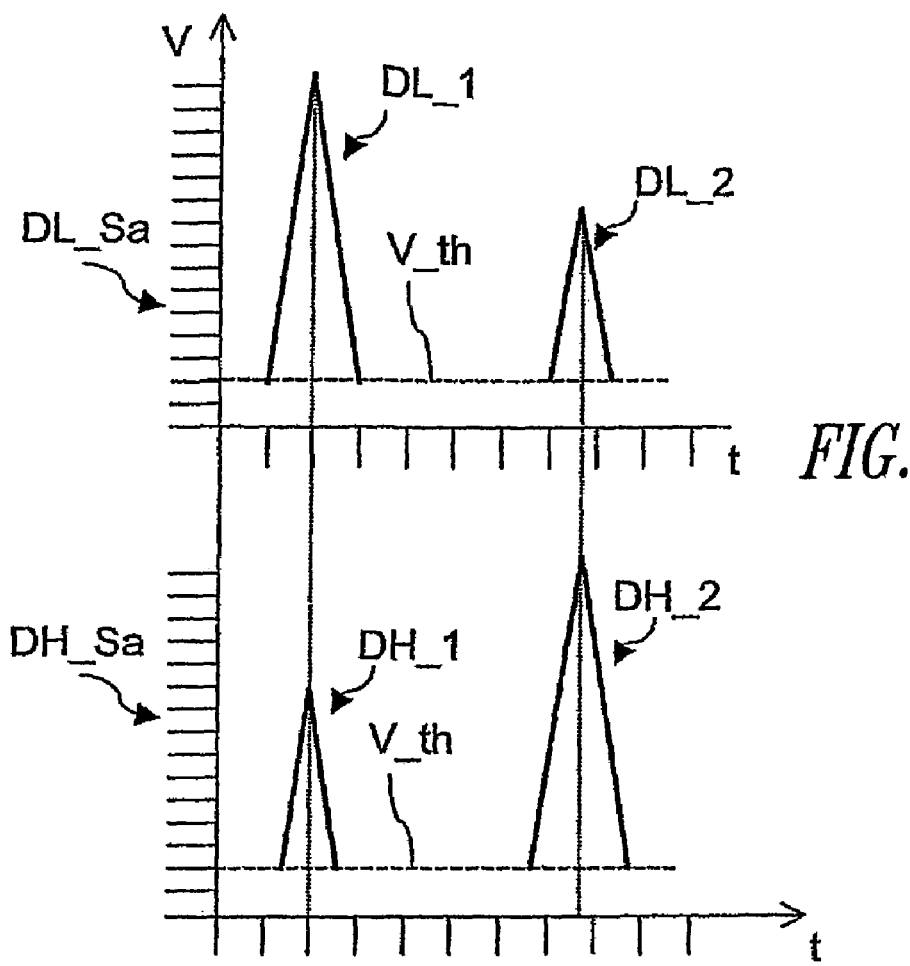
FIGS. 7a and 7b show time courses of particular examples of signals processed by the detection method in FIG. 6.

FIG. 7a schematically illustrates the time course of two above-threshold portions DL_1 and DL_2 of the useful signal DL_Sa and of two corresponding above-threshold portions DH_1 and DH_2 of the disturbance signal DH_Sa. The graphs in FIG. 7a show, for example, the time course of the amplitude of the voltage of the useful and disturbance signals. V_th indicates the minimum voltage threshold level used as a parameter in the comparison steps Th_L and Th_H.

In accordance with the selection criteria given above, used in the cross-check comparison step LH_Cmp, the portion of useful signal DL_1 is selected and, if necessary, stored or kept in memory, for subsequent processing, while the portion of useful signal DL_2 is discarded, i.e., not subjected to subsequent processing, being classified, for example, as originating from an external disturbance or environmental disturbance.

In accordance with the diagram given in FIG. 6, the detection method Det_M preferably includes a successive analysis step Sim_Det, to which the portions of useful signal selected during the cross-check comparison step LH_Cmp are subjected, in order to identify if said selected signal portions are generated by simulation carried out with the aim to conceal signals originating from attempts at malicious action. To this purpose, for example, the analysis step Sim_Det reveals particular signal properties such as the presence of characteristics which are substantially repetitive or the fact that the intensity of said signal is substantially within a pre-established range of intensity values judged to be sufficient to cover signals which are useful for the detection of attempts at malicious action.

If the step Sim_Det classifies portions of useful signal as originating from simulation, an alarm step Al-Out, included in the detection method, is started up and the subsequent steps are not performed as considered superfluous.

In accordance with the diagram illustrated in FIG. 6, the detection method Det_M preferably comprises a further analysis step Gev_Det intended to identify if the portions of useful signal selected during the cross-check comparison step LH_Cmp are generated by grave events, such as an attempt at sabotage performed by means of the use of explosives. In the example in FIG. 6, this step is performed only if the previous step Sim_Det does not classify portions of useful signal as originating from simulation.

Preferably, the grave event analysis step Gev_Det checks if the intensity, for example in instant amplitude value, of the portions of useful signal selected during the cross-check comparison step LH_Cmp, is very high, for example greater than a maximum pre-established value and, for example, significantly greater than intensity values typically presented by the detection signals.

If said maximum value is exceeded, the event which generated the signal supplied by the sensors 3 is classified during the analysis step Gev_Det as "grave event" and the alarm step Al-Out is started up while the remaining processing steps are not carried out as considered superfluous.

Figure 7B:
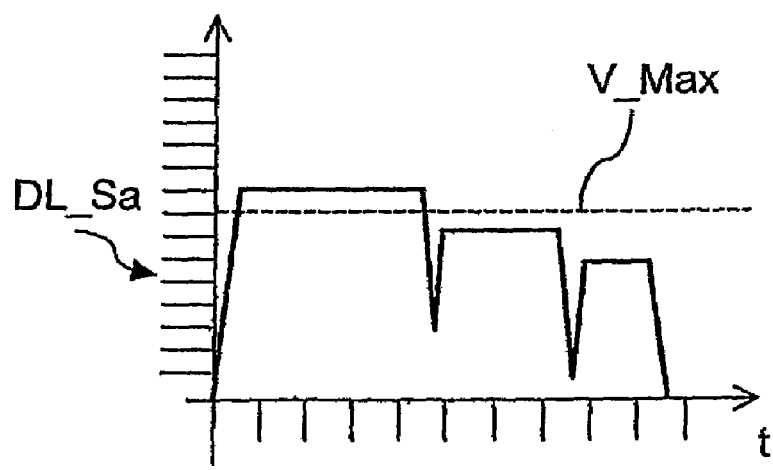

FIG. 7*b*, illustrates the time course of a portion of useful signal DL_Sa which presents a maximum instant amplitude greater than a pre-established maximum value V_Max. Said signal portion, therefore, will be classified during the analysis step Gev_Det as originating from a grave event.

As illustrated in the diagram in FIG. 6, the detection method preferably includes an acknowledgement step Lp_Ack to which the portions of useful signal selected during the cross-check comparison step LH_Cmp are subjected and which cannot be classified either as grave events or as simulation.

Preferably, the acknowledgement step Lp_Ack makes it possible to discard (i.e., not acknowledge) those portions of useful signal having a time duration lower than a pre-established minimum duration value. For example, said discarded portions are due to the extinction of the preceding transient state or following the passage of a pressure wave.

Preferably, said minimum duration required for acknowledgement depends on the amplitude (for example, on the peak value of the amplitude of a portion of useful signal) or on the intensity in general of the specific portion of useful signal subjected to the acknowledgement step Lp_Ack. Preferably, during the acknowledgment step Lp_Ack a table of correspondences is used, stored in the memory, where an intensity value is associated to the respective required minimum duration value.

As shown in FIG. 6, if the portion of useful signal is discarded during the acknowledgement step Lp_Ack, the detection method returns, following the arrow 62, to the reception step L_Rx in order to identify a successive portion of useful signal to be subjected, if necessary, to the processing steps described above.

On the contrary, a portion of useful signal acknowledged during the acknowledgement step Lp_Ack, i.e., not discarded, is classified as potentially representative of an attempt at malicious action and, therefore, subjected to further analysis. For the sake of simplicity, a portion of signal which has not been discarded will also be referred to with the expression "accepted or acknowledged portion of signal". An acknowledged portion of signal represents, therefore, a portion of signal which, after a certain number of processing and/or selection procedures, is classified as potentially representative of an attempt at malicious action. It should be observed that other acknowledgement criteria known to the skilled in the art can be used as an alternative to the particular acknowledgement step Lp_Ack described above.

Preferably, the detection method further comprises: a counting step Lp_Cnt of the number of said acknowledged portions of signal, a time counter T_Reg start-up/reset step T_Cnt, a step for selecting and counting consecutive pauses PS_Cnt between acknowledged portions of signal and a step S_Cnt for the identification of events with imperfect simultaneity between acknowledged portions of signals and signals supplied by sensors connected to other lines or channels (i.e., belonging to other groups).

All these steps are performed every time a portion of useful signal is accepted in the acknowledgement step Lp_Ack.

In particular, the step Lp_Cnt is such as to increment a first counter (or accepted useful signal counter) every time a portion of useful signal is accepted during the acknowledgement step Lp_Ack.

The step PS_Cnt is such as to increment a second counter (or pause counter) every time a pause, i.e., a time interval, with a duration greater than a pre-established minimum duration, is observed between the most recent acknowledged portion of signal and the acknowledged portion of useful signal immediately preceding it (if it exists). Preferably, said minimum duration depends on the amplitude (for example, on the peak value), or on the intensity in general, of the most recent acknowledged portion of useful signal. For example, during the pause counting step PS_Cnt, a lookup table stored in the memory, is used where an intensity value is associated to a respective required minimum duration value so that the pause is selected (i.e., accepted) and counted. On the contrary, pauses having a minimum duration time lower than that required are discarded.

Advantageously, the step S_Cnt of identifying "imperfect simultaneity" events between acknowledged portions of signal and signals supplied by sensors connected to other lines, makes it possible to check if a portion of signal acknowledged by the acknowledgement step Lp_Ack (thus classified as potentially representative of an attempt at malicious action) possesses the property of so-called "imperfect simultaneity" compared to signals picked up by sensors connected to lines different from the line where the above-mentioned acknowledged portion of signal comes from. In fact, it has been observed that, statistically, a perfect simultaneity between signals picked up by sensors belonging to different lines (i.e., to different groups) is unlikely to represent an attempt at malicious action. In other words, theoretically, it is possible for an attempt at malicious action to produce a pressure wave in the ground (in this example) which, hitting separate sensors (and arranged at a certain distance from each other), generates corresponding electrical signals which are exactly simultaneous, but the statistical frequency of such an event is very low.

On the other hand, it has been observed that perfect simultaneity, observed quite frequently, is likely to be representative of a so-called "common mode disturbance", such as a disturbance produced by the pipeline itself when a fluid is pumped into it under high pressure. Said fluid can cause the pipe to move and, consequently, generate pressure waves in the ground which act simultaneously on several sensors which, in their turn, provide signals which cannot be considered as representative of attempts at malicious action against the pipe.

For this reason, the step S_Cnt which identifies events of imperfect simultaneity makes it possible to identify and count which acknowledged portions of a signal coming from a given line are not perfectly simultaneous with signals coming from the other lines. Preferably, said signals coming from the other lines are to be considered useful signals, I.e., in output from respective filters L_F of the "lower pass band" type.

In a particularly preferred embodiment, the detection method (and, in particular, the processing module of each line, which in this embodiment is line A) includes a step BCD_IN for receiving above-threshold portions of useful signals picked up by the other lines B, C, D.

These above-threshold portions of useful signals are provided, for example, to the processing module of line A by the other processing modules by means of steps identical or similar to the comparison Th_L and output A_Out steps described above, with particular reference to the processing module of line A.

Preferably, a simultaneity between two portions (such as, for example, two impulses) of signals provided by sensors belonging to separate lines, is considered "imperfect" if the time distance of said portions of signal is greater than a minimum time value.

However, it can happen that said portions are at such a time distance that they are representative of two external events independent of each other, for example representative of two separate and unrelated events. In this case, the characteristic of "simultaneity" would not be present.

For this reason, for a simultaneity to be considered imperfect, said portions of signal must also have a time distance lower than a pre-established maximum time value. For example, in a preferred embodiment, the pre-established minimum time value and the pre-established maximum time value are approximately 50 ms and 300 ms respectively.

Preferably, in the step S_Cnt for identification of events of imperfect simultaneity, the detected imperfect simultaneities are counted, incrementing a suitable third counter (or counter of imperfect simultaneity events).

With reference again to the diagram in FIG. 6, the stop/start step T_Cnt of the time counter T_Reg is such as to:
- start the time counter T_Reg, if this has not already started when a portion of useful signal coming from line A is acknowledged in the step Lp_Ack (i.e., accepted);
- reset and restart the time counter T_Reg, if this has already started when a portion of useful signal coming from line A is acknowledged in the step Lp_Ack.

In a preferred embodiment, the time counter T_Reg:
- is a resource shared by all the processing modules of the different lines A, B, C, D of the same section T1 so that said counter can be read and started/reset by any one of said processing modules in the same way as described in detail above regarding the processing module of line A;
- stops when it reaches a pre-established maximum count time, at which point time counting is interrupted and reset.

In a particularly preferred embodiment, interruption and resetting of the above-described counting time are such as to automatically determine contemporaneous resetting of:
- the first counter (or counter of acknowledged useful signals);
- the second counter (or counter of accepted pauses); and
- the third counter (or counter of events of imperfect simultaneity); managed by the processing modules of all the lines A, B, C, D.

The above-mentioned maximum count time represents the time limit, calculated from the most recent acknowledged portion of useful signal and coming from any of the lines, within which a further portion of useful signal coming from any of the lines must be acknowledged. On the basis of the above, when said time limit is reached, the system automatically resets and the detection method is started up again.

As shown in FIG. 6, the detection method DET_M, and in particular each of the line processing modules, further comprises a step for evaluating the conditions of the alarm on a line, indicated with C_Eval.

This step makes it possible to evaluate, for example each time any of the following counters of the same line is modified:
- the first counter (or counter of acknowledged useful signals);
- the second counter (or counter of accepted pauses); and
- the third counter (or counter of events of imperfect simultaneity); if the combination of the values counted by them is such as to satisfy a pre-established condition of alarm. For example, the pre-established condition of alarm is a condition which requires each of said counted values to reach or exceed a pre-established respective minimum count value.

In different embodiment, the step of evaluating the condition of alarm is performed at pre-established time intervals (for example, in accordance with a timer connected to a clock system), independently of the previous steps and, therefore, independently of the updating of one of the three above-mentioned counters.

As illustrated in FIG. 6 (observe arrow 63), in a preferred embodiment, the step of evaluating the condition of alarm C_Eval can also collect useful information, for detecting an alarm condition, from the above-threshold disturbance signals, in output from the comparison step Th_H. In fact, on the basis of on-site experimental measurements, the Applicant observed that, in some marginal cases, particular attempts at malicious action can be detected by analyzing particular characteristics of the portions of above-threshold disturbance signals, in addition to the conditions (counters) acquired by means of acknowledged portions of useful signal and as well as the conditions of imperfect simultaneity. For example, one characteristic which is useful to take into consideration is the reception of above-threshold portions of a disturbance signal at substantially regular intervals (pauses). Another characteristic which is useful to take into consideration is the consecutive reception of a certain number (for example more than three) of above-threshold portions of the disturbance signal, having high intensity levels and very similar to each other, possibly followed by a certain number of acknowledged portions of useful signal.

Experiments have revealed that, advantageously, by means of a detection method and system according to the present invention, it is possible to detect in good time attempts at malicious action while, at the same time, substantially systematically ignoring environmental disturbances of various kinds, even those which are unpredictable.

It should be observed that, advantageously, a detection system according to the present invention can be produced with sensors having a passive electronic part. This feature is particularly advantageous since it reduces the maintenance and installation costs of the system which, in some cases, has to cover tens or hundreds of kilometers.

Furthermore, the system also possesses an important feature, i.e., flexibility. In fact, by adapting the few parameters described above (thresholds, timing) which are typical of the detection method, it is possible to adapt the system to the most varied operating conditions.

Finally, it should be observed that the memory and computational resources required to carry out the detection method described above are very modest, especially when compared to systems known in the art based on comparison with signals data bases.

Naturally, in order to satisfy contingent and specific requirements, a person skilled in the art may apply to the above-described detection method and system module according to the invention many modifications and variations, all of which, however, are included within the scope of protection of the invention as defined by the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for detecting and classifying signals as deriving from an environmental disturbance or as deriving from an attempt at malicious action at an installation under surveillance, based on signals provided by a plurality of sensors distributed near the installation, comprising:
    receiving a first signal from by a first sensor of the plurality of sensors in reply to an external event;
    filtering the received first signal with a first filter having a first pass band overlapping a first portion of spectrum to obtain a first intensity value, the first portion of the spectrum typically occupied by signals from the sensors in reply to attempts at malicious action;
    filtering the received first signal with a second filter having a second pass band overlapping a second portion of spectrum to obtain a second intensity value, the first portion of the spectrum typically occupied by signals from the sensors in reply to environmental disturbances;
    comparing the first and second filtered signals;
    classifying the received first signal as deriving from an environmental disturbance in response to the first filtered signal having the first intensity value lower than the second intensity value;
    classifying the received first signal as deriving from a malicious action in response to the first filtered signal having the first intensity value greater than the second intensity value; and
    in response to determining that the first signal is derived from the malicious action,
        receiving a second signal detected by a second sensor of the plurality of sensors, the second sensor being spatially adjacent to the first sensor;
        evaluating the difference in reception times of the first and the second signals; and
        classifying the external event as a common mode disturbance if the evaluated difference is lower than a pre-established minimum value.

2. The method according to claim 1, wherein the first and the second filters, respectively, have a first central frequency and a second central frequency, the second central frequency being greater than the first central frequency.

3. The method according to claim 1, wherein the received first signal is an analog signal and wherein the comparing is preceded by digitalizing the first and second filtered signals.

4. The method according to claim 1, wherein the comparing comprises:
    comparing and classifying substantially time-overlapping portions of the first and second filtered signals respectively.

5. The method according to claim 4, wherein at least one portion of the first filtered signal not classified as deriving from an environmental disturbance is selected for farther processing.

6. A method for detecting and classifying signals as deriving from an environmental disturbance or as deriving from an attempt at malicious action at an installation under surveillance, based on signals provided by a plurality of sensors distributed near the installation comprising:
    receiving a first signal from by a first sensor of the plurality of sensors in reply to an external event;
    filtering the received first signal with a first filter having a first pass band overlapping a first portion of spectrum to obtain a first intensity value, the first portion of the spectrum typically occupied by signals from the sensors in reply to attempts at malicious action;
    filtering the received first signal with a second filter having a second pass band overlapping a second portion of spectrum to obtain a second intensity value, the first portion of the spectrum typically occupied by signals from the sensors in reply to environmental disturbances;
    comparing and classifying substantially time-overlapping portions of the first and second filtered signals respectively;
    detecting if at least one portion of the first signal not classified as deriving from an environmental disturbance originated in reply to an external action corresponding to simulation carried out in order to mask signals originating in reply to attempts at malicious action;
    classifying the received first signal as deriving from an environmental disturbance in response to the first filtered signal having the first intensity value lower than the second intensity value; and
    classifying the received first signal as deriving from a malicious action in response to the first filtered signal having the first intensity value greater than the second intensity value.

7. The method according to claim 6, detecting if the at least one portion of the first signal not classified as deriving from an environmental disturbance originated in reply to an external action comprises:
    verifying if the intensity value of the at least one portion of the first signal not classified as deriving from an environmental disturbance falls within a pre-established range of intensity values.

8. A method for detecting and classifying signals as deriving from an environmental disturbance or as deriving from an attempt at malicious action at an installation under surveillance, based on signals provided by a plurality of sensors distributed near the installation comprising:

receiving a first signal from by a first sensor of the plurality of sensors in reply to an external event;

filtering the received first signal with a first filter having a first pass band overlapping a first portion of spectrum to obtain a first intensity value, the first portion of the spectrum typically occupied by signals from the sensors in reply to attempts at malicious action;

filtering the received first signal with a second filter having a second pass band overlapping a second portion of spectrum to obtain a second intensity value, the first portion of the spectrum typically occupied by signals from the sensors in reply to environmental disturbances;

comparing and classifying substantially time-overlapping portions of the first and second filtered signals respectively;

detecting if at least one portion of the first signal not classified as deriving from an environmental disturbance originated in reply to an external action corresponding to a grave event;

classifying the received first signal as deriving from an environmental disturbance in response to the first filtered signal having the first intensity value lower than the second intensity value; and classifying the received first signal as deriving from a malicious action in response to the first filtered signal having the first intensity value greater than the second intensity value.

9. The method according to claim 8, wherein the grave event is an explosion.

10. The method according to claim 8, further comprising:
verifying if the intensity value of the at least one portion of first signal not classified as deriving from an environmental disturbance is greater than a pre-established maximum intensity value.

11. A method for detecting and classifying signals as deriving from an environmental disturbance or as deriving from an attempt at malicious action at an installation under surveillance, based on signals provided by a plurality of sensors distributed near the installation comprising:

receiving a first signal from by a first sensor of the plurality of sensors in reply to an external event;

filtering the received first signal with a first filter having a first pass band overlapping a first portion of spectrum to obtain a first intensity value, the first portion of the spectrum typically occupied by signals from the sensors in reply to attempts at malicious action;

filtering the received first signal with a second filter having a second pass band overlapping a second portion of spectrum to obtain a second intensity value, the first portion of the spectrum typically occupied by signals from the sensors in reply to environmental disturbances;

comparing and classifying substantially time-overlapping portions of the first and second filtered signals respectively;

selecting at least one portion of the first filtered signal not classified as deriving from an environmental disturbance;

accepting on the basis of a pre-established criterion, the selected portion of signal in response to the selected portion of the signal being classified as potentially representative of an attempt at malicious action;

classifying the received first signal as deriving from an environmental disturbance in response to the first filtered signal having the first intensity value lower than the second intensity value; and classifying the received first signal as deriving from a malicious action in response to the first filtered signal having the first intensity value greater than the second intensity value.

12. The method according to claim 11, further comprising:
discarding the selected portion of the signal in response to the selected portion of the signal having a time duration value lower than a pre-established minimum duration value; and confirming the selected portion in response to the selected portion of the signal having the time duration value greater than the pre-established minimum duration value.

13. The method according to claim 12, wherein the pre-established minimum duration value depends on the intensity value of the selected portion of signal.

14. The method according to claim 11, further comprising:
counting the accepted portions of the signal.

15. The method according to claim 11, further comprising:
selecting and counting time intervals between the accepted portions of the signal that consecutively follow each other.

16. The method according to claim 1, wherein the comparing is preceded by processing, comprising:

comparing the first filtered signal to a first minimum threshold level; and selecting at least a first portion of the first filtered signal having an intensity value greater than the first minimum threshold level.

17. The method according to claim 1, wherein the comparing is preceded by processing, comprising:

comparing the second filtered signal to a second minimum threshold level; and selecting at least a second portion of the second filtered signal having an intensity value greater than the second minimum threshold level.

18. The method according to claim 17, wherein the comparing compares the first and second portions if the portions are substantially time overlapping.

19. A detection system with a plurality of sensors that classifies received signals as deriving from environmental disturbances or as potentially representative of attempts at malicious action, comprising:

a first sensor of the plurality of sensors operable to generate a first signal in response to a detected disturbance in the proximity of the first sensor;

a second sensor of the plurality of sensors operable to generate a second signal in response to the detected physical disturbance, the second sensor located in the proximity of the first sensor;

a first filter having a first pass band overlapping a first portion of a spectrum, the first portion typically occupied by signals supplied by the plurality of sensors in reply to attempts at malicious action;

a second filter having a second pass band overlapping a second portion of the spectrum, the second portion typically occupied by signals supplied by the sensors in reply to environmental disturbances; and a control unit operable to:
receive a first signal provided by the first sensor in reply to the detected physical disturbance;

obtain a first filtered signal by filtering the received first signal with the first filter;

obtain a second filtered signal by filtering the first received signal with the second filter;

compare the first and second filtered signals;

classify the received first signal as deriving from an environmental disturbance if the first filtered signal has an intensity value lower than the intensity value of the second filtered signal;

evaluate a difference in reception times of the first and the second signals; and classify the detected disturbance as a common mode disturbance if the evaluated difference is lower than a pre-established minimum value.

20. The detection system according to claim 19, wherein the control unit is further operable to classify the received first signal as deriving from an attempt at malicious action if the first filtered signal has an intensity value greater than the intensity value of the second filtered signal.

* * * * *